Patented Oct. 11, 1927.

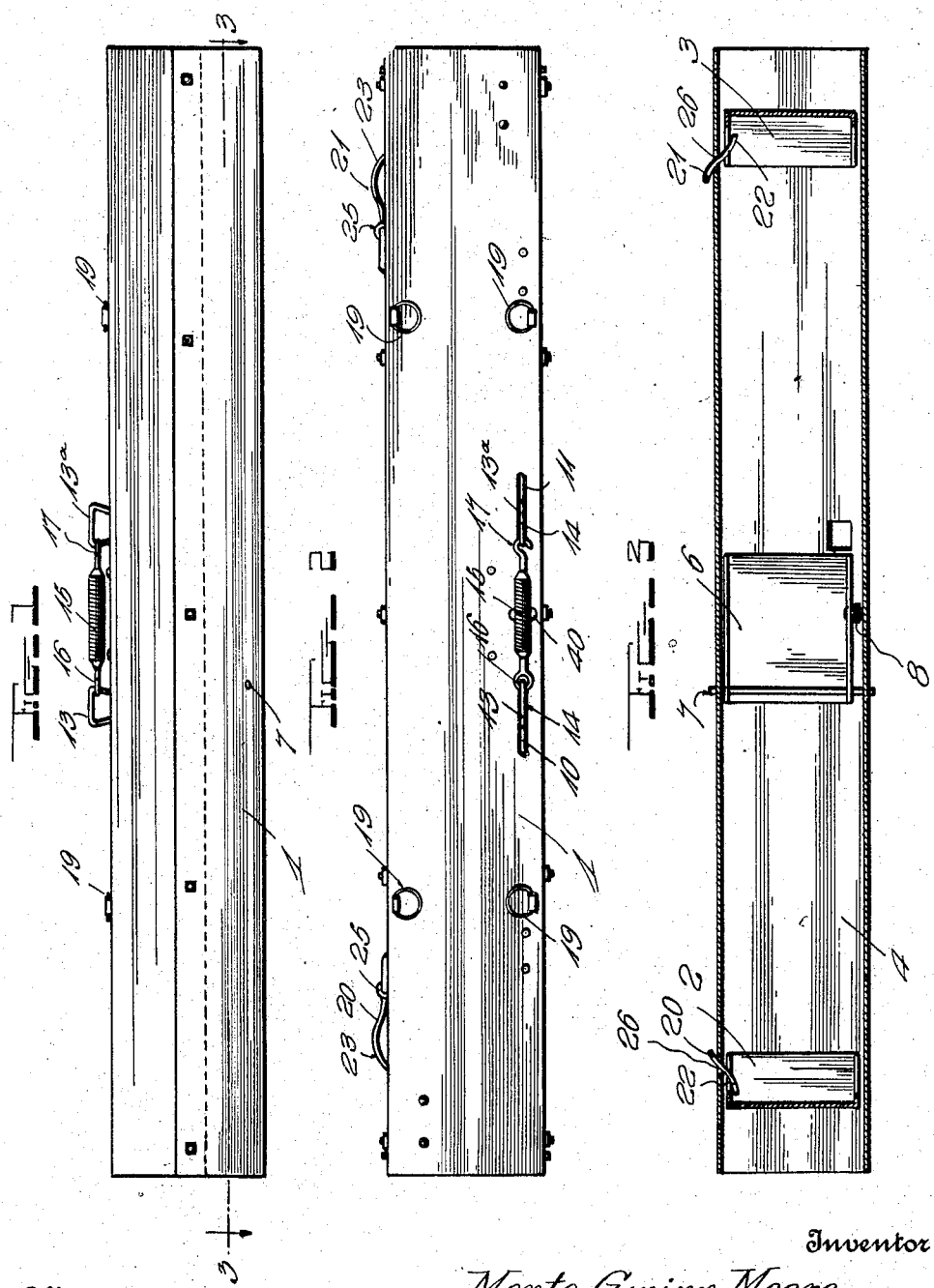

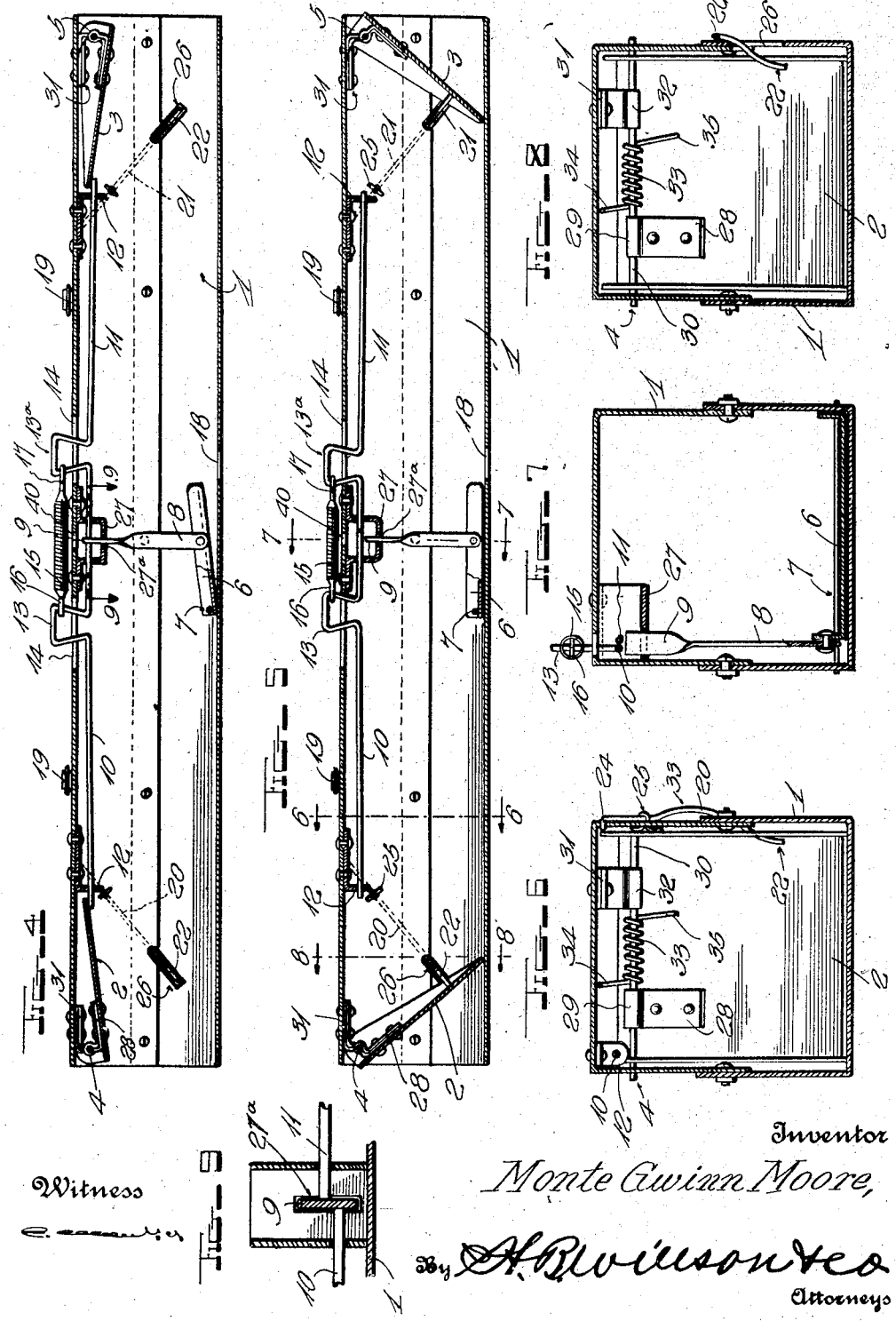

1,645,444

UNITED STATES PATENT OFFICE.

MONTE GWINN MOORE, OF PRAIRIE CITY, OREGON.

ANIMAL TRAP.

Application filed October 25, 1926. Serial No. 144,111.

This invention relates to animal traps of the box type, wherein the trapped animal is retained without injury, which is especially desirable in the case of fur-bearing animals or those desired to be kept alive for various purposes.

In this connection, the invention recognizes that in a trap of this character to accomplish this function of catching and retaining without injury the trapped animal, it is desirable to so construct the trap that wary animals will enter it without suspicion and in passing therethrough will necessarily contact with and operate a trigger mechanism to release doors for closing the ends of the runway and thereby imprison the animal, the runway being without any projections such as would be liable to injure the fur or the animal itself.

A primary object of the invention is to provide a trap in the form of a runway with spring-controlled doors at each end held in open position against the tension of their springs by mechanism releasable by contact of an animal passing through the runway.

Another object is the provision of a releasing trigger mechanism employed in connection with a treadle located in the path of an animal passing through the runway spring-closed doors at the ends of the runway being released by the actuation of said mechanism by stepping of the animal on the treadle.

In carrying out these objects, the invention is susceptible of modification without departing from the spirit or sacrificing any of the advantages of the claimed invention, there being shown in the drawing for illustrative purposes a preferred and practical form, in which:—

Fig. 1 represents a side elevation of the trap embodying the invention;

Fig. 2 is a top plan view thereof;

Fig. 3 is a horizontal section on line 3—3 of Fig. 1;

Fig. 4 is a longitudinal section showing the parts in the position occupied when set;

Fig. 5 is a similar view with the trap sprung or in closed position;

Fig. 6 is a transverse section taken on line 6—6 of Fig. 5;

Fig. 7 is a similar view on line 7—7 of Fig. 5;

Fig. 8 is a similar view on line 8—8 of Fig. 5; and

Fig. 9 is a detail horizontal section on line 9—9 of Fig. 4.

Similar reference characters represent corresponding parts throughout the several figures of the drawing.

In the adaptation of the invention shown, the trap comprises an elongated box-like casing 1 constructed of any suitable material and of any desired size according to the animal it is intended to trap. This casing is open at its ends to form a through passage or runway and is equipped with doors 2 and 3 preferably hinged at their upper edges to swing upward and inward into the casing when the trap is set, as shown in Fig. 4. In this position, the trap constitutes a through runway into which a wary animal is more apt to venture than into a box having only one opening. These doors 2 and 3 have spring hinges 4 and 5 which normally thrust them downward when released and catches 20 and 21 lie in their path and are designed to spring back of them when the doors are closed to hold them against opening by the trapped animal. These catches are preferably spring-pressed and the major portion of each is located outside the casing so as to present a minimum obstruction for the trapped animal and avoid any injury to the animal should he race around in an attempt to get out. The free ends 22 of these catches extend into the casing in the path of the doors 2 and 3 (see Figs. 3, 6 and 8) and when the doors swing downward, they move outward permitting the doors to pass and when the doors reach closed position these ends spring out behind them and prevent opening of the doors by the impounded animal. As shown these spring catches are each constructed of a piece of spring wire bowed outwardly intermediate its ends at 23 with its upper end 24 at right angles and inserted in an aperture 24ª in the side wall of the casing. These wires pass through keepers in the form of eyes 25 on the outside of the casing and have their free ends extended through openings 26 in the casing side walls in a plane below and in advance of the openings 24ª.

The hinges 4 and 5 are exactly alike and as shown clearly in Figs. 6 and 8 each comprises a strap 28 secured to the door near one side edge and having a knuckle 29 to receive a pintle 30 which extends across the trap and into bearings in the side walls thereof. Another hinge strap 31 is secured to the top of the casing on its inner face near the side of the trap opposite to that on which strap 28 is mounted. This strap 31 also has a knuckle 32 to receive pintle 30. A coiled spring 33 is wound on pintle 30 with one end 34 bearing on the casing top and the other end 35 on the door. This arrangement strengthens the door and distributes the strain on the hinge.

The trigger mechanism for holding the doors in open position comprises a platform or treadle 6 pivoted at one end as shown at 7 on the bottom of the casing and which has extending upwardly from the other end thereof an arm 8 having a flattened upper end 9 designed to be clamped between two longitudinally movable spring-pressed rods 10 and 11, whereby the treadle is held in raised position (see Fig. 4). These rods 10 and 11 are located at the top of the runway and mounted to slide in keepers 12 and 27 depending from the casing top and they are also provided with upstanding loops 13 and 13ª which extend through slots 14 in the casing top. These loops, one of which is carried by each of the rods, are connected by a coil spring 15, one end of which is permanently engaged with loop 13 preferably by means of an eye 16, and the other detachably engaged with the other loop 13ª by a hook 17 so that the spring may be readily connected or released in the setting of the trap.

The rods 10 and 11 are of a length sufficient to extend under and support the doors 2 and 3 when in raised position as shown in Fig. 4, and when the rods are moved outwardly for this purpose. The loops 13 and 13ª are also designed for use as finger grips in manipulating the rods to set the trap for holding the doors in open position. The keeper 27 which is shown located midway the length of the casing is made box-like in form with the rods extending loosely through the end walls thereof and the end 9 of arm 8 through an opening 27ª in the bottom of said keeper, said keeper operating to prevent the arm from dropping down into the casing when released from rods 10 and 11. The inner ends of rods 10 and 11 are arranged parallel and are visible through an opening 40 in the top of the casing so that the setting of the trigger mechanism may be observed. The end 9 of arm 8 may be positioned between the rods and projected a greater or less distance according to whether the trap is to be used for large or small animals. The inner ends of the slots 14 operate as stops for loops 13 and 13ª to limit the inward movement of rods 10 and 11 when the arm 8 is lowered out of engagement therewith by the depressing of the platform 6. The trip member 8 extends through a slot 27ª in the bottom of keeper 27 and when set extends between the inner ends of rods 10 and 11 which are out of alinement and bear on opposite faces of end 9 of arm 8. By this arrangement should one door only be used, the rod of that door engaging the arm end 9 will force said arm against the opposite side of the keeper slot and thereby hold the trip member in raised position.

The bottom of the casing 1 has an opening 18 located below the free end of the platform or treadle 6 so that in setting the trap, the operator may insert his fingers through said opening and lift the platform to position the flattened end 9 of the arm 8 in the space between the rods 10 and 11 so that when said rods are moved into engagement with the doors 2 and 3 and the spring 15 connected with the loops 13 and 13ª thereof, the arm 8 will be clamped between the opposite ends of the rods and the treadle or platform will be held in this position, the insertion of the arm 8 between the inner ends of the rods will hold their outer ends projected sufficiently to support the doors.

In the use of this trap, it may be located and surrounded by any desired means for concealing it and rendering it unnoticeable so that a wary animal may be caused to enter the runway without suspicion. In setting the trap, the spring 15 has the hook end 17 thereof disengaged from the rod loop 13ª and the doors 2 and 3 are raised against the tension of their spring hinges and the rods projected to extend under and hold them in this position. The platform or treadle 6 is then elevated in the manner above described until the flat end 9 of the arm 8 is located in the path of the inner ends of the rods. When so located, the spring 15 is again engaged with the loop 13ª by means of the hook 17 and will thereby clampingly hold the ends of the rods engaged with the arm 8 thereby retaining the platform in operative position. An animal entering through either end of the runway and stepping on said platform 6 which may contain bait or not, as desired, will depress said platform and cause the arm 8 to be drawn from between the ends of the rods 10 and 11 thereby permitting the spring 15 to contract and draw said rods out of engagement with the doors 2 and 3. When released, these doors will swing downwardly by means of the spring hinges thereof, dropping into the position shown in Fig. 5 and in their closing will force the catches 20 and 21 outwardly and permit them to spring back behind the doors when closed so that the trapped animal cannot open the doors.

The animals impounded within this trap may be either killed afterwards by any suitable means or they may be removed alive and kept for any purpose desired.

Rings 19 are preferably secured to the top of the casing to receive shoulder straps (not shown) for use in carrying the trap from place to place.

Without further description, it is thought that the features and advantages of this invention will be readily apparent to those skilled in the art, and it will be understood that changes in the proportion and minor details of construction may be resorted to without departing from the spirit of the invention or its scope as claimed.

I claim:—

1. In a trap, a box having an entrance opening, a door hinged at one edge to close said opening, a door-holding member supported on one wall of said box and movable toward and from the door and adapted to positively hold said door in open position when said member is moved toward the door, a keeper through which said holding member slides and having an opening therein, a trip arm extending through said opening into the path of and adapted to be engaged by said holding member and forced thereby against one wall of said opening whereby the holding member is held projected and the trip arm held in set position, and a trip arm releasing member connected with said arm and located in said casing in the path of an animal entering through said entrance opening and adapted to be held in raised position when said trip arm is engaged by said door holding member.

2. In a trap, a body forming a through runway, doors closing the ends of said runway and swinging inward, two longitudinally movable door-holding bars positioned to overlie and positively hold the doors open, a trip member adapted to be inserted between the adjacent ends of said door-holding bars and be clampingly secured thereby, spring means for holding said bars engaged with said trip member, and a tripping plate connected with said trip member and adapted to be held in raised position when said trip member is engaged by said door-holding bars, downward movement of said plate operating to release the bars and permit them to disengage from the doors.

3. In a trap, a box-like body having open ends and forming a through runway, doors hinged by their upper edges to close said runway and to swing upward and inward, spring latches adapted to engage said doors and hold them closed, two longitudinally movable door-holding bars supported to move lengthwise of said runway with their outer ends positioned to underlie their respective doors when said doors are raised and with their inner ends opposed, a releasing trip member insertible between the opposed ends of said bars to force them outward into door-engaging position, a coiled spring releasably connecting said bars to hold them in clamping engagement with said trip member and to retract them when the trip member is removed, and a trip plate connected with said member and located in the path between the doors so that an animal stepping thereon will disengage the trip member and release the door-holding bars.

4. In a trap, a body forming a through runway, doors closing the ends of said runway and swinging inwardly and upwardly, two longitudinally movable door-holding rods supported to move lengthwise of said runway with their outer ends positioned to underlie the respective doors when the latter are raised and with their other ends opposed, each rod having a loop, a coiled spring engaged with one loop and detachably engaged with the other whereby the bars are moved toward each other, a trip member adapted to be clampingly engaged between the inner ends of said rods, and a trip plate carried by said trip member and positioned between said doors in the path of an animal entering through either of them whereby the plate is depressed by an animal stepping thereon and the trip member disengaged from the rods to permit the doors to close.

5. In a trap, a body forming a through runway, doors closing the ends of said runway and swinging inwardly and upwardly, springs mounted to normally close said doors, bars supported to move lengthwise said runway with the outer end of each positioned to positively engage its respective door when the latter is raised, said bars having their other ends opposed, the wall on which said bars is mounted being longitudinally slotted, loops carried by said bars projecting through the slots in said wall, a coiled spring connecting said loops to move said bars toward each other, a trip member insertible between the opposed ends of said bars to force them outward into engagement with the doors, and a trip plate carried by said trip member and held in raised position when the trip member is engaged by the bars.

In testimony whereof I have hereunto affixed my signature.

MONTE GWINN MOORE.